(12) United States Patent
Hamamoto et al.

(10) Patent No.: US 7,898,191 B2
(45) Date of Patent: Mar. 1, 2011

(54) DISCHARGE LAMP LIGHTING DEVICE AND LIGHT FIXTURE

(75) Inventors: Katunobu Hamamoto, Neyagawa (JP); Kei Mituyasu, Hirakata (JP); Yosikazu Kado, Suita (JP); Hirosi Murayama, Jakarta (ID); Hiroyuki Hirose, Nishinomiya (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 475 days.

(21) Appl. No.: 12/160,677

(22) PCT Filed: Jan. 16, 2007

(86) PCT No.: PCT/JP2007/050483

§ 371 (c)(1),
(2), (4) Date: Jul. 11, 2008

(87) PCT Pub. No.: WO2007/083618

PCT Pub. Date: Jul. 26, 2007

(65) Prior Publication Data

US 2010/0253233 A1    Oct. 7, 2010

(30) Foreign Application Priority Data

Jan. 17, 2006    (JP) ............................ P2006-009182
Nov. 28, 2006    (JP) ............................ P2006-320582

(51) Int. Cl.
    *H05B 37/02*    (2006.01)
(52) U.S. Cl. ...................... 315/307; 315/224; 315/247; 315/360
(58) Field of Classification Search ............. 315/200 R, 315/209 R, 224–226, 244, 247, 283, 287, 315/291, 307–308, 360
See application file for complete search history.

(56) References Cited

U.S. PATENT DOCUMENTS 5,170,099 A * 12/1992 Ueoka et al. ................. 315/291

(Continued)

FOREIGN PATENT DOCUMENTS

JP    9-97683    4/1997

(Continued)

OTHER PUBLICATIONS

English language Abstract of JP 2002-43086, Feb. 8, 2002.

(Continued)

*Primary Examiner*—Douglas W Owens
*Assistant Examiner*—Tung X Le
(74) *Attorney, Agent, or Firm*—Greenblum & Bernstein P.L.C.

(57) ABSTRACT

In order to suppress cost of an initial investment by a user and running cost to the user to a low extent while substantially constantly maintaining an apparent illuminance, and further, to realize resource saving, in a case of using a fluorescent lamp FHF 32 as a discharge lamp La, a lamp supply power is started to be supplied from a value lower than 45 W as rated electric power at an initial period of an operation of the discharge lamp, a light adjustment signal is changed in response to an accumulated lighting time so that the lamp supply power can be a value higher than 45 W as the rated electric power on and after a rated lifetime of the discharge lamp La, whereby the lamp supply power (output of an inverter circuit 2) is adjusted. In the fluorescent lamp FHF 32, a light/electric power ratio becomes substantially constant when the lamp supply power is 41 W to 55 W, and accordingly, a light quantity is increased without impairing light emission efficiency of the discharge lamp La, and as a result, the apparent illuminance can be maintained substantially constantly.

9 Claims, 12 Drawing Sheets

U.S. PATENT DOCUMENTS

| | | | |
|---|---|---|---|
| 6,127,788 A * | 10/2000 | Yamamoto et al. | 315/307 |
| 6,891,336 B1 * | 5/2005 | Mita | 315/224 |
| 7,180,251 B2 * | 2/2007 | van Eerden | 315/291 |
| 7,728,528 B2 * | 6/2010 | Chan et al. | 315/224 |
| 2007/0210727 A1 | 9/2007 | Sun et al. | |
| 2008/0030143 A1 | 2/2008 | Goriki et al. | |
| 2008/0048586 A1 | 2/2008 | Hasegawa et al. | |
| 2008/0143270 A1 | 6/2008 | Sun et al. | |
| 2008/0157693 A1 | 7/2008 | Yamamoto et al. | |

FOREIGN PATENT DOCUMENTS

| | | |
|---|---|---|
| JP | 2000-91090 | 3/2000 |
| JP | 2001-15275 | 1/2001 |
| JP | 2002-43086 | 2/2002 |
| JP | 2004-193075 | 7/2004 |

OTHER PUBLICATIONS

English language Abstract of JP 2004-193075, Jul. 8, 2004.
English language Abstract of JP 2000-91090, Mar. 31, 2000.
English language Abstract of JP 9-97683, Apr. 8, 1997.
English language Abstract of JP 2001-15275, Jan. 19, 2001.

* cited by examiner (a)

(b)

(a)

(b)

(a)

(b)

DISCHARGE LAMP LIGHTING DEVICE AND LIGHT FIXTURE

TECHNICAL FIELD

The present invention relates to a discharge lamp lighting device, and to a light fixture that mounts the discharge lamp lighting device thereon.

BACKGROUND ART

In general, it has been known that a luminous flux of a discharge lamp such as a fluorescent lamp for use in an illumination purpose is decreased following elapse of an operating time. Accordingly, heretofore, a discharge lamp lighting device that suppresses the decrease of the luminous flux (illuminance) of the discharge lamp, which follows the elapse of the operating time, has been provided (for example, refer to Japanese Patent Laid-Open Publications Nos. H9-97683 and 2001-15275).

Such a conventional discharge lamp lighting device suppresses an illuminance of the discharge lamp at an initial period of such an operation at approximately 70 to 80% of a value at the time of rated lighting. The discharge lamp lighting device performs a light adjustment control so as to increase the luminous flux following the elapse of the operating time, and thereby can substantially constantly maintain an apparent illuminance during an operating period until the end of a lifetime. Moreover, the discharge lamp lighting device has an advantage that electric power saving can be achieved in such a manner that, at the initial period of the operation, the discharge lamp lighting device performs the light adjustment and the lighting while reducing electric power consumed in the discharge lamp than rated electric power.

Incidentally, a rated value of the electric power supplied to the discharge lamp (for example, the fluorescent lamp) is defined by a manufacturer of the discharge lamp. The electric power supplied to the discharge lamp is increased in substantially proportional to a shape of the discharge lamp. For example, as straight tube fluorescent lamps, there are: one with a shape in which a tube length is approximately 600 mm and a tube diameter is approximately 25.5 mm, and with defined electric power of approximately 23 W; and one with a shape in which a tube length is approximately 1200 mm and a tube diameter is approximately 25.5 mm, and with defined electric power of approximately 45 W. Moreover, as luminous flux characteristics of the fluorescent lamp when the rated electric power is supplied thereto, an initial luminous flux (luminous flux after elapse of 100 hours from the beginning of the operation) is made public. Furthermore, a rated lifetime of the discharge lamp is defined as a shorter one between a time until which a luminous flux deterioration reaches 70% of such initial characteristics and a time until which a filament is broken with regard to the straight tube fluorescent lamp.

Moreover, in indoor light equipment, in order to obtain an illuminance required for a working surface, the number of installed light fixtures (units) is decided by taking, as variables, a floor space, a lamp luminous flux (the above-described initial luminous flux), the number of lamps, a light loss factor, and the like. This light loss factor is decided so as to obtain the required illuminance at the point of time when the rated lifetime comes while considering the above-described luminous flux deterioration of the fluorescent lamp itself, a decrease of reflectivity owing to adhesion of dirt to the fluorescent lamp and the light fixture, and the like. For example, in a light fixture of a bottom-open type, a light loss factor thereof is set at 0.7 in a general operating environment, and the light loss factor is set at 0.74 as a guide in a place where an occurrence of dust is small and the air is always kept clean. In this light equipment, as the light loss factor becomes smaller, the number of light fixtures required to be installed is increased, leading to an increase of cost of the equipment. Hence, if it is assumed that types of the fluorescent lamps for use are the same, and that environments where the light fixtures are installed are the same, then illuminances at the time when the lifetime of the lamp is ended become substantially equal to each other between the following cases, which are: a case of using the general discharge lamp lighting device in which the illuminance is not suppressed from the initial period of the operation; and a case of performing the control to substantially constantly maintain the illuminance so that the illuminance can be always 70 to 80% of the value of the initial luminous flux while considering the decrease of the illuminance in advance. Then, the installed light fixtures in both of the cases also become equal in number to each other.

However, in comparison with a configuration of the general discharge lamp lighting device that does not suppress the illuminance from the initial period of the operation, it is necessary to add a configuration for performing the control to substantially constantly maintain the illuminance to the above-described conventional discharge lamp lighting device. Accordingly, cost of the device and the light fixture is increased, which in turn results in an increase of cost of a capital investment by a user.

Moreover, in the above-described discharge lamp lighting device, the illuminance at the initial period of the operation is suppressed to approximately 70 to 80%, whereby electric power saving of approximately 10 to 15% can be achieved during the period from the initial period of the operation to the rated lifetime in comparison with the general discharge lamp lighting device that does not suppress the illuminance from the initial period of the operation, thus making it possible to reduce running cost charged to the user. However, for the conventional discharge lamp lighting device, the electric power saving and resource saving cannot be desired any more in terms of obtaining the illuminance required for the working surface as a lighting subject of the light equipment.

The present invention has been made in consideration for the above-descried circumstances. It is an object of the present invention to provide a discharge lamp lighting device and a light fixture, which are capable of suppressing the cost of the initial investment by the user and the running cost to the user to a low extent while substantially constantly maintaining the apparent illuminance, and further, are capable of realizing the resource saving.

DISCLOSURE OF THE INVENTION

In order to achieve the above-described object, an invention of claim 1 is a discharge lamp lighting device having: an inverter circuit that includes one or a plurality of switching elements and converts a direct current input into a high frequency alternating current output by switching the switching elements at a high frequency; one or a plurality of resonating inductors and one or a plurality of resonating capacitors, which compose a resonant circuit together with a discharge lamp and are connected between output terminals of the inverter circuit; and a light adjustment control circuit that adjusts high frequency electric power supplied from the inverter circuit through the resonant circuit to the discharge lamp by controlling the switching of the switching elements, wherein the light adjustment control circuit includes: electric power correcting means for controlling the high frequency electric power of the inverter circuit to gradually increase following elapse of an operating time of the discharge lamp during a period from an operation start of the discharge lamp to a predetermined time after the discharge lamp reaches a rated lifetime thereof; and electric power suppressing means for controlling the high frequency electric power of the inverter circuit to become a predetermined value or less on and after the predetermined time, and the predetermined value is a value larger than 1.2 times electric power defined by a tube shape, tube length and tube diameter of the discharge lamp.

An invention of claim 2 is the discharge lamp lighting device in the invention of claim 1, wherein the electric power correcting means includes time counting means for counting an accumulated lighting time of the discharge lamp, adjusts the high frequency electric power of the inverter circuit in response to the accumulated lighting time counted by the time counting means, and adjusts the high frequency electric power of the inverter circuit so that electric power equal to or more than the defined electric power can be supplied to the discharge lamp at a point of time of the operation start of the discharge lamp.

An invention of claim 3 is the discharge lamp lighting device in the invention of claim 1, wherein the electric power correcting means includes light quantity detecting means for detecting a light quantity of the discharge lamp, adjusts the high frequency electric power of the inverter circuit in response to the light quantity detected by the light quantity detecting means, and adjusts the high frequency electric power of the inverter circuit so that electric power equal to or more than the defined electric power can be supplied to the discharge lamp at a point of time of the operation start of the discharge lamp.

An invention of claim 4 is the discharge lamp lighting device in the invention of any one of claims 1 to 3, wherein the predetermined value is a value equal to or more than 1.3 times the defined electric power.

An invention of claim 5 is the discharge lamp lighting device in the invention of any one of claims 1 to 3, wherein, in a case where the discharge lamp is a straight tube fluorescent lamp having a tube length of approximately 1200 mm and a tube diameter of approximately 25.5 mm, the predetermined value is set at 65 W or less.

An invention of claim 6 is the discharge lamp lighting device in the invention of any one of claims 1 to 3, wherein, in a case where the discharge lamp is a compact fluorescent lamp having a tube length of approximately 410 mm and a tube diameter of approximately 17.5 mm, the predetermined value is set at 42 W or less.

An invention of claim 7 is the discharge lamp lighting device in the invention of any one of claims 1 to 6, wherein preheating current supplying means for supplying a current to a filament of the discharge lamp is provided, and the preheating current supplying means reduces a value of the current supplied after the discharge lamp is started than a value of the current at an advanced preheating time when the current is supplied to the discharge lamp before the discharge lamp is started.

An invention of claim 8 is the discharge lamp lighting device in the invention of claim 7, wherein the preheating current supplying means includes: a primary winding through which a high frequency current is flown by the inverter circuit; a secondary winding connected to the filament of the discharge lamp and magnetically coupled to the primary winding to flow, to the filament, a current in which a phase is inverted with respect to a phase of a lamp current of a time when the discharge lamp is lighted; and a switching element inserted into a power feed line from the inverter circuit to the primary winding.

In order to achieve the above-described object, an invention of claim 9 is a light fixture, including: the discharge lamp lighting device according to any one of claims 1 to 8; a fixture body to which the discharge lamp lighting device is attached: and sockets which are provided on the fixture body, allow a discharge lamp to be mounted thereon freely detachably, and electrically connect the discharge lamp lighting device and the discharge lamp to each other.

In accordance with the present invention according to the above-described claims 1 to 9, it is possible to provide the discharge lamp lighting device and the light fixture, which are capable of suppressing the cost of the initial investment by the user and the running cost to the user to a low extent while substantially constantly maintaining the apparent illuminance, and further, are capable of realizing the resource saving.

BRIEF DESCRIPTION OF THE DRAWINGS

FIG. 2(a) is a graph showing a relationship between electric power (lamp supply power) supplied to a lamp and a light/electric power ratio; and FIG. 2(b) is a graph showing relationships between a lighting time and the lamp supply power.

FIG. 3(b) is a perspective view of the light fixture when viewed from below; and FIG. 3(b) is a cross-sectional view of the light fixture.

FIG. 9(a) is a graph showing a relationship between the lamp supply power and the light/electric power ratio; and FIG. 9(b) is a graph showing a relationship between the lighting time and the lamp supply power.

BEST MODE FOR CARRYING OUT THE INVENTION

First Embodiment

Figure 1:
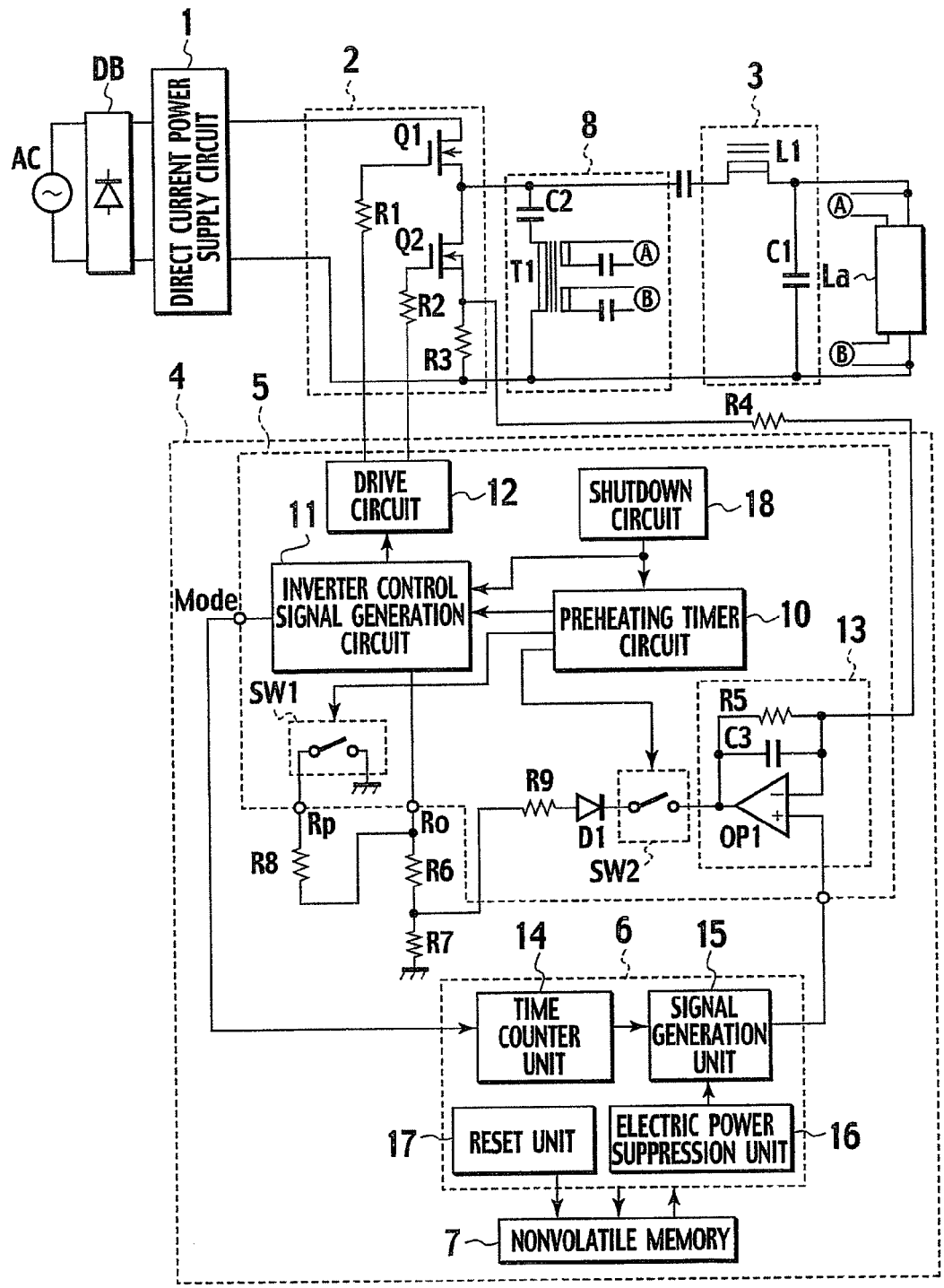
FIG. 1 is a circuit configuration diagram of a discharge lamp lighting device according to a first embodiment to which the present invention is applied.

FIG. 1 shows a circuit configuration diagram of a discharge lamp lighting device according to a first embodiment to which the present invention is applied. This discharge lamp lighting device performs full-wave rectification for an alternating current output of a commercial alternating current power supply AC by a diode bridge DB, and inputs the rectified output to a direct current power supply circuit 1. The direct current power supply circuit 1 is composed of a DC/DC converter (for example, a boost chopper circuit) that converts such a pulsation output inputted from the diode bridge DB into a direct current output with a desired voltage. An inverter circuit 2 is a conventionally well-known one of a half bridge type. The inverter circuit 2 is composed in such a manner that a pair of switching elements Q1 and Q2 composed of MOSFETs are connected in series between output terminals of the direct current power supply circuit 1. Note that input resistors R1 and R2 are connected to gate terminals of the switching elements Q1 and Q2, respectively. A detection resistor R3 is connected to a source terminal of the switching element Q2 on a low side.

To a series circuit composed of the switching element Q2 on the low side and the detection resistor R3, a resonating inductor L1 and a resonating capacitor C1, which compose a resonant circuit 3 together with a discharge lamp La, are connected in series while interposing a capacitor for cutting a direct current therebetween. The discharge lamp La is connected in parallel to the resonating capacitor C1.

Moreover, a preheating circuit 8 for supplying a preheating current to filaments of the discharge lamp La is connected between the inverter circuit 2 and the resonant circuit 3. In this preheating circuit 8, a capacitor C2 for cutting the direct current and a primary winding of a preheating transformer T1 are connected between output terminals of the inverter circuit 2, and a pair of secondary windings of the preheating transformer T1 are individually connected to the respective filaments of the discharge lamp La.

A light adjustment control circuit 4 includes: an inverter control unit 5 that performs a switching control for the pair of switching elements Q1 and Q2 composing the inverter circuit 2; a correction control unit 6 that corrects a light quantity of the discharge lamp La following an accumulated lighting time thereof; and a rewritable nonvolatile memory 7 that stores the accumulated lighting time.

The inverter control unit 5 has: an advanced preheating mode of switching the switching elements Q1 and Q2 at a frequency (preheating frequency) sufficiently higher than a no-load resonant frequency of the resonant circuit 3, thereby supplying the preheating current to the filaments of the discharge lamp La from the preheating circuit 8 of the discharge lamp La; a starting mode of switching the switching elements Q1 and Q2 at a frequency (starting frequency) lower than the preheating frequency and higher than the no-load resonant frequency, thereby applying a starting voltage to the discharge lamp La; and a lighting mode of stably lighting the discharge lamp La at a frequency (lighting frequency) higher than a resonant frequency of the time when the discharge lamp La is lighted after the discharge lamp La is started. The inverter control unit 5 adjusts high frequency electric power supplied to the discharge lamp La in such a manner that the lighting frequency is increased and reduced by the correction control unit 6.

The inverter control unit 5 includes: an inverter control signal generation circuit 11 that generates an inverter control signal for performing the switching control for the switching elements Q1 and Q2; a drive circuit 12 that drives the switching elements Q1 and Q2 in response to the inverter control signal outputted from the inverter control signal generation circuit 11; and a preheating timer circuit 10 that limits a period (advanced preheating period) of the advanced preheating mode.

The inverter control signal generation circuit 11 is composed of an integrated circuit (IC) including a constant voltage buffer circuit, a constant voltage mirror circuit, an oscillating capacitor (any of which is not shown), and the like. For the inverter control signal generation circuit 11, a series circuit of resistors R6 and R7 and a series circuit of a switch circuit SW1 which the inverter control unit 5 includes and a resistor R8 are connected between a ground and a terminal Ro of the inverter control unit 5, which is connected to an output terminal of the constant voltage buffer circuit. Specifically, a constant voltage is applied to the terminal Ro, and the inverter control signal generation circuit 11 operates so as to raise a frequency (=switching frequencies of the switching elements Q1 and Q2) of the inverter control signal as a current flowing through the terminal Ro is increased.

After the commercial alternating current power supply AC is turned on and the inverter control unit 5 is activated, the preheating timer circuit 10 turns on the switch circuit SW1 and starts to limit the advanced preheating period. When the switch circuit SW1 is switched on, the current flowing through the terminal Ro is increased. Accordingly, the frequency of the inverter control signal becomes relatively high, and the inverter control unit 5 enters into the advanced preheating mode of switching the switching elements Q1 and Q2 at the preheating frequency. Then, when the preheating timer circuit 10 finishes limiting the advanced preheating period and switches off the switch circuit SW1, the current flowing through the terminal Ro is decreased. Accordingly, the frequency of the inverter control signal becomes relatively low, and the inverter control unit 5 shifts to the starting mode of switching the switching elements Q1 and Q2 at the starting frequency. Moreover, when a switch circuit SW2 is switched on, the preheating timer circuit 10 connects (conducts) the terminal Ro to an electric power correction circuit 13 while interposing a resistor R9 therebetween, a diode D1 and the switch circuit SW2, which are connected to a node between the resistors R6 and R7.

The electric power correction circuit 13 includes an operational amplifier OP1 that has a noninverting input terminal (+) and an inverting input terminal (−). In the operational amplifier OP1 of the electric power correction circuit 13, a light adjustment signal to be described later is inputted to the noninverting input terminal, and a both-end voltage (detection voltage) of the detection resistor R3 is inputted to the inverting input terminal through a resistor R4. A feedback resistor R5 and a capacitor C3 are connected in parallel to each other between the inverting input terminal of the operational amplifier OP1 and an output terminal thereof, and the electric power correction circuit 13 has a configuration of an integrating circuit. The output terminal of the operational amplifier OP1 is connected to a cathode of the diode D1 while interposing the switching circuit SW2 therebetween. Moreover, an anode of the diode D1 is connected to the node between the resistors R6 and R7 while interposing the resistor R9 therebetween.

Specifically, by using the fact that currents flowing through the switching elements Q1 and Q2 of the inverter circuit 2 are substantially proportional to lamp electric power consumed in the discharge lamp La, the electric power correction circuit 13 applies negative feedback to an output voltage of the operational amplifier OP1 in the case where the detection voltage of the detection resistor R3 does not coincide with a signal voltage of the light adjustment signal, and thereby increases and reduces the current of the terminal Ro through the resistor R9 and the diode D1. In such a way, the inverter control unit 5 adjusts an oscillation frequency (switching frequencies of the switching elements Q1 and Q2) of the inverter circuit 2, and operates the electric power correction circuit 13 so that the lamp power (detection voltage of the detection resistor R3) can be a value corresponding to the light adjustment signal. However, until the switch circuit SW2 is switched on by the preheating timer circuit 10, that is, during the advanced preheating period and the starting period, the switch circuit SW2 is switched off, whereby the above-described control operation of the electric power correction circuit 13 is prohibited.

Here, in the light adjustment control circuit 4, there is provided a shutdown circuit 18 that detects a no-load state, an end-of-lifetime state of the discharge lamp La, and the like and stops the operation of the inverter circuit 2. Upon receiving detection signals from a no-load detection circuit and an end-of-lifetime detection circuit (any of which is not shown), such a shutdown circuit 18 stops the operations of the inverter control signal generation circuit 11 and the preheating timer circuit 10, or stops a drive signal outputted from the drive circuit 12, and thereby stops the operation of the inverter circuit 2.

The correction control unit 6 includes a time counter unit 14 that counts the accumulated lighting time of the discharge lamp La upon receiving a mode signal outputted from the inverter control signal generation circuit 11 through a terminal Mode of the inverter control unit 5. The mode signal is a signal that turns to an H level when the drive signal is outputted from the drive circuit 12, and to an L level when the drive signal is not outputted therefrom. The timer counter unit 14 performs such a time counting operation only in the case where the mode signal is at the H level.

Moreover, the correction control unit 6 includes a signal generation unit 15 that generates the light adjustment signal for adjusting the light quantity of the discharge lamp La in response to the accumulated lighting time outputted from the time counter unit 14. This signal generation unit 15 stores a correction table that shows a correspondence relationship between the accumulated lighting time and a direct current voltage level (level corresponding to a light quantity ratio when a level of rated lighting is taken as 100%) of the light adjustment signal. From the correction table, the signal generation unit 15 reads out the light adjustment signal corresponding to the accumulated lighting time outputted from the time counter unit 14, and outputs the readout light adjustment signal to the light adjustment control circuit 4 (electric power correction circuit 13). However, the light adjustment signal outputted from the signal generation unit 15 is limited by an electric power suppression unit 16 so that the electric power supplied to the discharge lamp La cannot exceed an upper limit value thereof. The upper limit value of the electric power supplied to the discharge lamp La is 55 W as will be described later, for example, in the case of using an FHF (straight tube fluorescent lamp) 32 as the discharge lamp La. Note that the accumulated lighting time stored in the nonvolatile memory 7 is reset (initialized) by a reset unit 17 when the discharge lamp La is replaced.

Next, a description will be made of an operation of the correction control unit 6. When the correction control unit 6 is activated in such a manner that the commercial alternating current power supply AC is turned on for the discharge lamp lighting device, first, the correction control unit 6 reads out the accumulated lighting time stored in the nonvolatile memory 7 and temporarily stores the accumulated lighting time in a memory (not shown), and reads out the light adjustment signal corresponding to the accumulated lighting time concerned from the correction table, and outputs the readout light adjustment signal to the inverter control unit 5. Meanwhile, the time counter unit 14 starts to count a time from a point of time when the discharge lamp lighting device is activated, and the signal generation unit 15 adds the time counted by the time counter unit 14 to the accumulated lighting time stored in the memory, and updates contents stored in the nonvolatile memory 7. As a result, the direct current voltage level of the light adjustment signal will be monotonously increased by the correction control unit 6 so as to gradually increase the high frequency electric power supplied to the discharge lamp La following the increase of the accumulated lighting time of the discharge lamp La.

Figure 2:
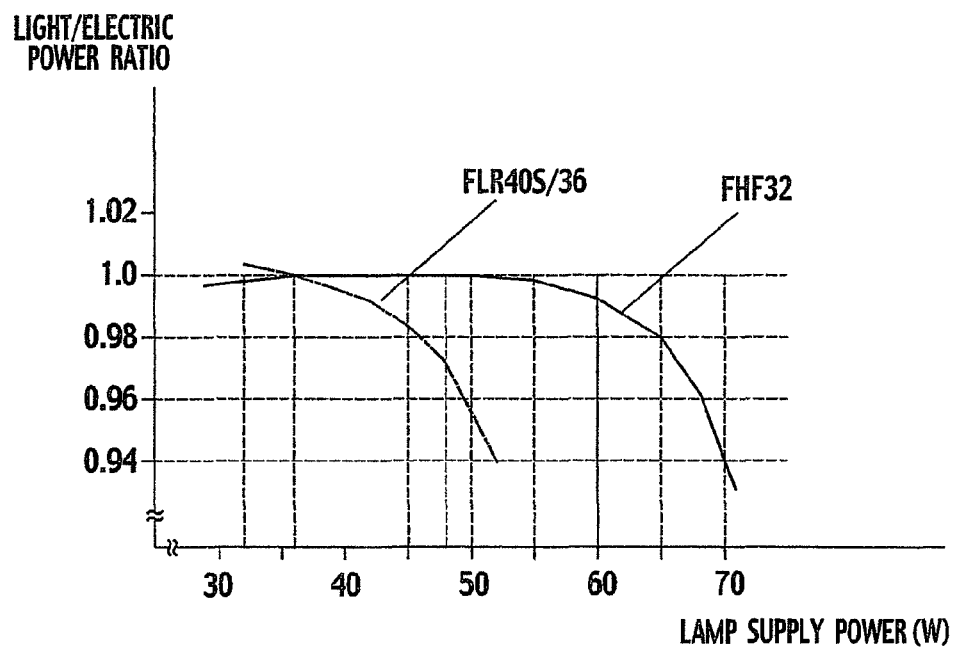
FIGS. 2(a) and 2(b) are operation explanatory diagrams of the discharge lamp lighting device according to the first embodiment to which the present invention is applied.
Figure 2:
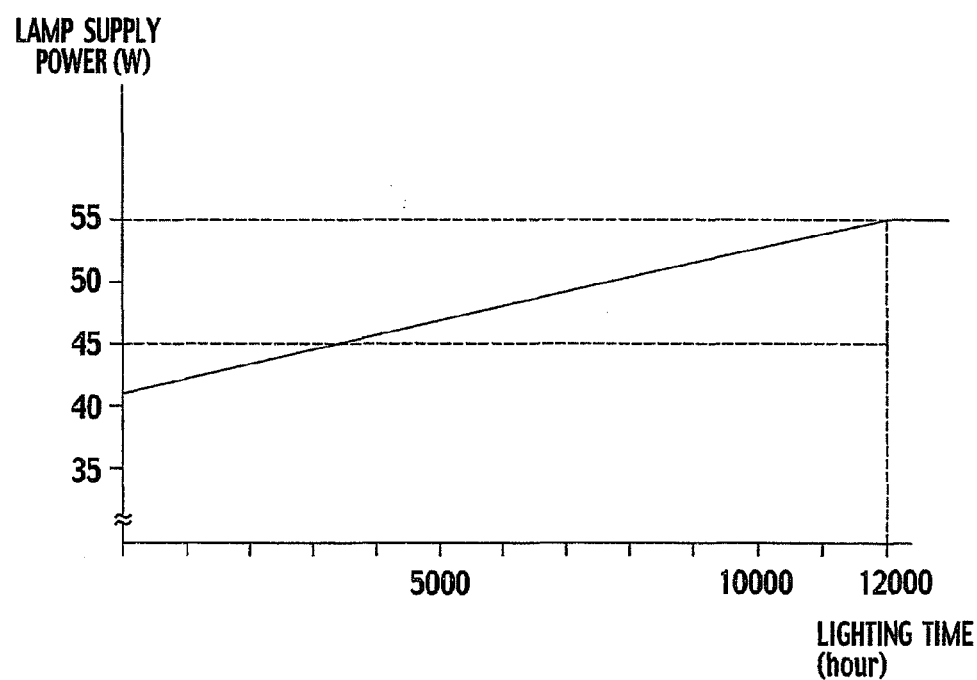

Here, the inventors of the present invention investigated relationships between the lamp electric power and the light quantity for two types of the straight tube fluorescent lamps (FHF 32, FLR 40S/36), and then results shown in FIG. 2(a) were obtained. In FIG. 2(a), the electric powers (lamp supply powers) supplied to the fluorescent lamps are taken on an axis of abscissas, and values (light/electric power ratios) normalized by a light quantity of the time when the lamp supply powers are at rated values (45 W in FHF 32, and 36 W in FLR 40S/36) are taken on an axis of ordinates, characteristics of the FHF 32 are shown by a solid line, and characteristics of the FLR 40S/36 are shown by an alternate long and short dash line. Note that the FHF 32 is a high frequency fluorescent lamp with a tube length of 1200 mm and a tube diameter of 25.5 mm, in which the rated lamp electric power is 32 W or 45 W, and the FLR 40S/36 is a rapid-start fluorescent lamp with a tube length of 1200 mm and a tube diameter of 25.5 mm in the same way as above, in which the rated lamp electric power is 36 W.

As obvious from FIG. 2(a), in the fluorescent lamp FHF 32, results were obtained, that the light/electric power ratio became substantially 1.0 in the case where the lamp supply power was 55 W or less, and that the light/electric power ratio started to be gradually decreased when the lamp supply power exceeded 55 W, and became approximately 0.98 when the lamp supply power was 65 W. As opposed to this, in the fluorescent lamp FLR 40S/36, a result that the light/electric power ratio became approximately 0.98 when the lamp supply power was slightly more than approximately 40 W was obtained.

Accordingly, in the case of using the fluorescent lamp FHF 32 as the discharge lamp La, the light fixture including the discharge lamp lighting device according to the first embodiment starts to supply the lamp supply power from a value lower than 45 W as the rated electric power at the initial period of the operation, changes the light adjustment signal in response to the accumulated lighting time so that the lamp supply power can be a value higher than 45 W as the rated electric power on and after a rated lifetime of the discharge lamp La, and thereby adjusts the lamp supply power (output of the inverter circuit 2).

Specifically, as shown in FIG. 2(b), the light fixture sets the relationship between the accumulated lighting time and the light adjustment signal so as to allow the following. First, the lamp supply power at the point of time when the lighting is started (when the accumulated lighting time is 0) is allowed to be set at 41 W. Then, the lamp supply power is allowed to be linearly increased during a period from 0 to 12000 hours as the rated lifetime of the FHF 32 in the accumulated lighting time so that the lamp supply power can be 55 W at the point of time when 12000 hours elapse. Moreover, constant electric power (=55 W) is allowed to be supplied after the lamp supply power reaches 55 W. Thereafter, the light fixture stores the set relationship in the correction table. Here, the lamp supply power (=55 W) at the point of time when the rated lifetime elapses becomes a value approximately 1.22 times the rated electric power (=45 W).

Moreover, in the case of adjusting the lamp supply power as described above, a lamp current becomes the following values. When the lamp supply power is 41 W at the initial period of the operation, the lamp current becomes approximately 0.35 A. When the accumulated lighting time is 3500 hours, and the lamp supply power is 45 W, the lamp current becomes approximately 0.42 A. When the accumulated lighting time is 7000 hours, and the lamp supply power is 49 W, the lamp current becomes approximately 0.48 A. When the accumulated lighting time is 10000 hours, and the lamp supply power is 53 W, the lamp current becomes approximately 0.51 A. Finally, when the accumulated lighting time is 12000 hours or more, and the lamp supply power is 55 W, the lamp current becomes approximately 0.54 A. Here, a filament temperature of the discharge lamp La rises following the increase of the lamp supply power. For example, the filament temperature of the case where the lamp supply power is 53 W rises by approximately 5 to 10% from the filament temperature of the case where the lamp supply power is 45 W. In this case, the filament temperature is generally suppressed to a low value until when the accumulated lighting time reaches approximately 7000 hours. Accordingly, there is no apprehension that the lifetime of the discharge lamp La may be significantly impaired even in the case of performing the correction control as described above. Moreover, as shown in FIG. 2(a), in the fluorescent lamp FHF 32, the light/electric power ratio becomes substantially constant when the lamp supply power is 41 W to 55 W, and accordingly, the light quantity can be increased without impairing light emission efficiency of the discharge lamp La.

Figure 3:
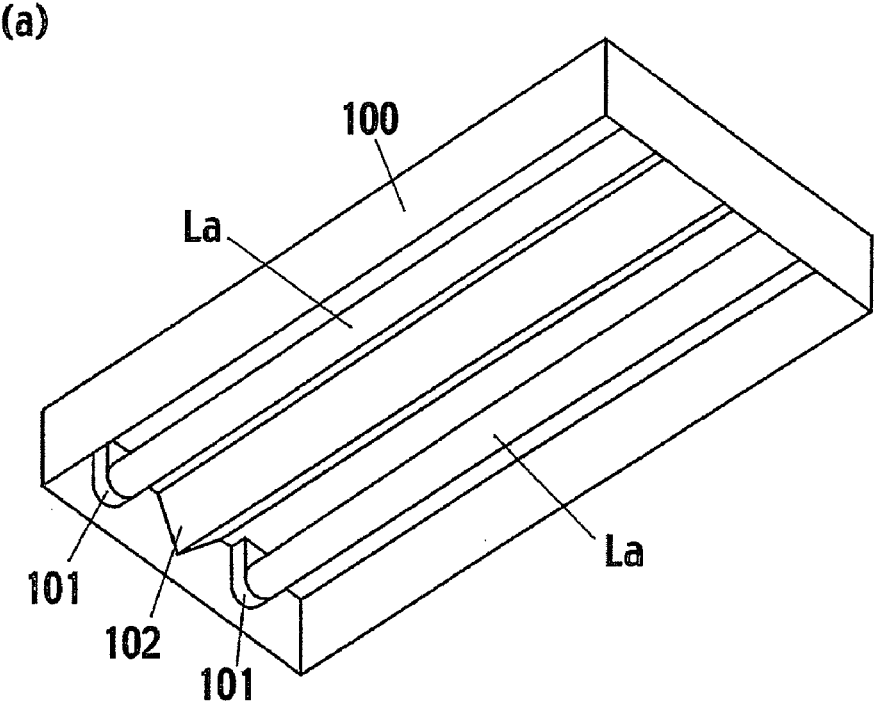
FIGS. 3(a) and 3(b) are configuration views of a light fixture in the first embodiment to which the present invention is applied.
Figure 3:
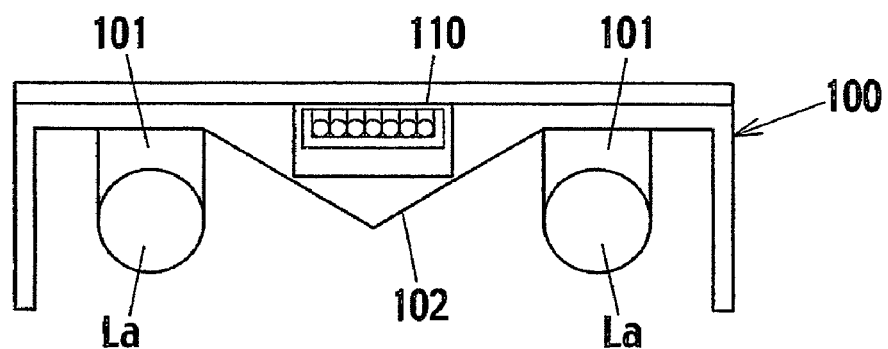

In FIG. 3, a light fixture including the discharge lamp lighting device according to the first embodiment is shown. This light fixture includes: a fixture body 100 with a shape of a rectangular box in which a lower surface is open; lamp sockets 101, each pair of which is provided on both side surfaces opposite to each other in a longitudinal direction of the fixture body 100, and mounts thereon the discharge lamp La composed of the fluorescent lamp FHF 32; and a reflection plate 102 with a triangular shape, which is provided on a bottom surface of the fixture body 100 between two discharge lamps La and La mounted on the respective lamp sockets 101. With regard to this light fixture, the discharge lamp lighting device 110 according to the first embodiment is housed in an inside of the reflection plate 102.

In the case of mounting the conventional discharge lamp lighting device (comparative example) that suppresses the luminous flux from the initial period of the operation, since lamp efficiency of the FHF 32 is approximately 110 lm/W, the number of installed light fixtures is decided by taking the following luminous flux as a reference based on the idea of the light loss factor:

$$45\ W \times 110\ lm/W \times 0.7 = 3465\ lm$$

Note that 0.7 in the above-described expression is a light loss factor preset as a target, and is a value set in response to an operating environment of the lamp.

As opposed to this, the light fixture including the discharge lamp lighting device according to the first embodiment takes the following luminous flux as a reference:

$$55\ W \times 110\ lm/W \times 0.7 = 4235\ lm$$

In this discharge lamp lighting device, the luminous flux is increased by approximately 1.2 times that of the conventional discharge lamp lighting device (comparative example). Hence, in an installed place of the light fixtures, which requires ten units thereof in the case of using the light fixtures using the conventional discharge lamp lighting devices, a substantially equivalent illuminance will be obtained only by eight units of the light fixtures using the discharge lamp lighting devices according to the first embodiment.

Moreover, the discharge lamp lighting devices of the first embodiment and the comparative example will be compared with each other with regard to average electric power consumption from the initial period of the operation of the discharge lamps La to the rated lifetime thereof. The average electric power consumption of the conventional discharge lamp lighting devices (comparative example) becomes as follows:

$$10\ units \times 2\ lamps \times \{(45\ W \times 0.7) + 45\ W\}/2 = 765\ W$$

The average electric power consumption of the discharge lamp lighting devices according to the first embodiment becomes as follows:

$$8\ units \times 2\ lamps \times \{(55\ W \times 0.7) + 55\ W\}/2 = 748\ W$$

Therefore, in accordance with the light fixture including the discharge lamp lighting device according to the first embodiment, electric power saving equivalent to that of the conventional discharge lamp lighting device (comparative example) is made possible. Moreover, the number of installed light fixtures and the number of usage discharge lamps La are saved to approximately 80% of those of the case of using the light fixture including the conventional discharge lamp lighting device. Therefore, in accordance with the discharge lamp lighting device according to the first embodiment, usage materials are naturally saved to 80% in terms of amount, thus making is possible to realize resource saving.

Second Embodiment

Figure 4:
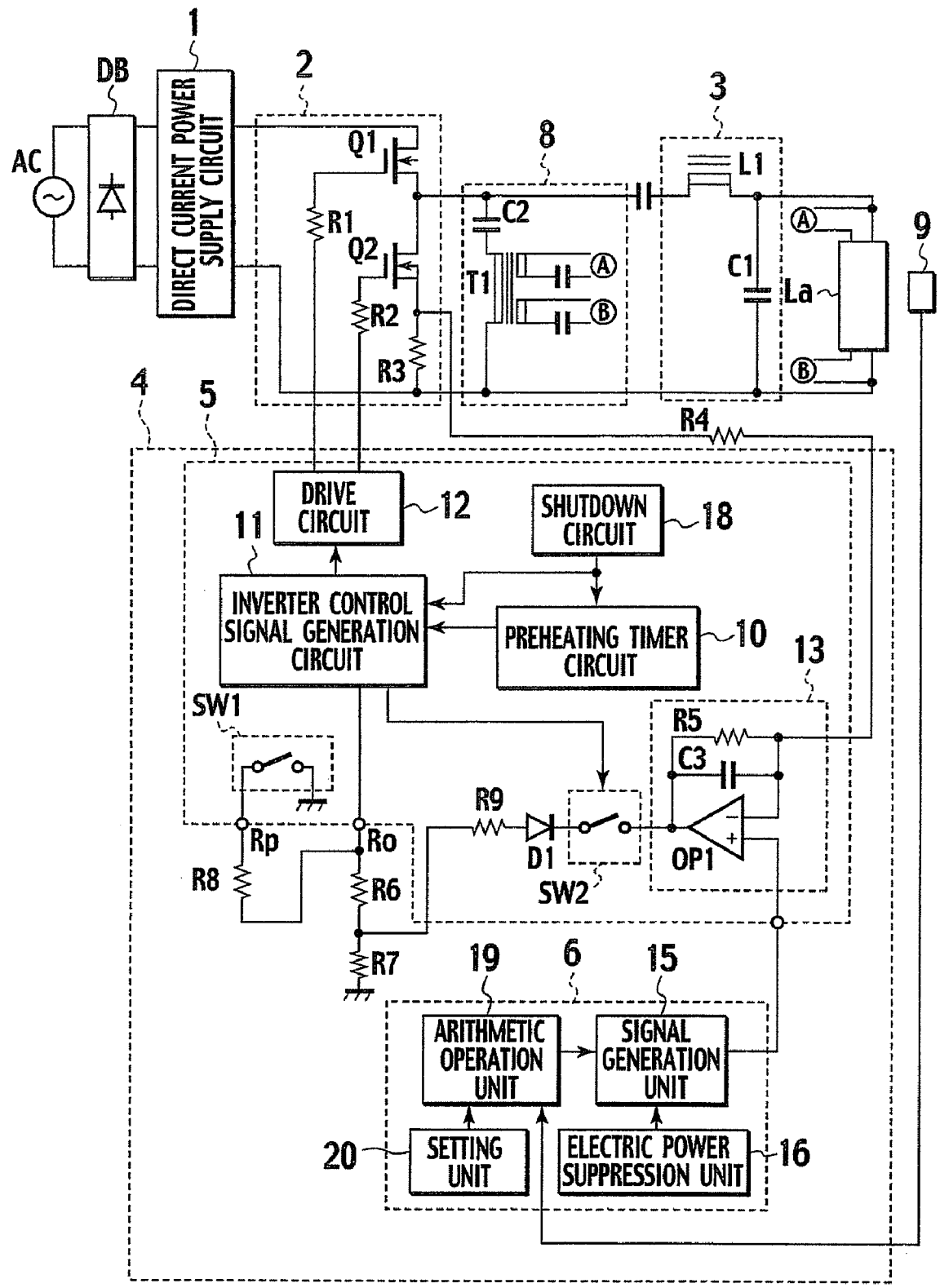
FIG. 4 is a circuit configuration diagram of a discharge lamp lighting device according to a second embodiment to which the present invention is applied.

In FIG. 4, a circuit configuration diagram of a discharge lamp lighting device according to a second embodiment of the present invention is shown. In a configuration of the discharge lamp lighting device according to the second embodiment, the same reference numerals will be assigned to portions common to the discharge lamp lighting device according to the first embodiment in terms of the configuration, and a description of the common portions will be omitted.

The discharge lamp lighting device according to the second embodiment includes a light quantity sensor 9 that detects the light quantity of the discharge lamp La. The discharge lamp lighting device has a feature in that, in response to the light quantity detected the light quantity sensor 9, the correction control unit 6 generates the light adjustment signal and adjusts the lamp supply power to the discharge lamp La.

The light quantity sensor 9 is composed by including, for example, a solar battery, and outputs a detection signal composed of a voltage proportional to the light quantity of the discharge lamp La to the correction control unit 6.

The correction control unit 6 includes an arithmetic operation unit 19 and a setting unit 20 in place of the time counter unit 14 and the reset unit 17, which have been described in the first embodiment. In the setting unit 20, there is stored level data of the detection signal proportional to the light quantity of the discharge lamp La. Here, the level data corresponds to a target light quantity. To the signal generation unit 15, the arithmetic operation unit 19 outputs correction data corresponding to a difference between a level of the detection signal proportional to the light quantity of the discharge lamp La and the level data stored in the setting unit 20. Then, in response to the correction data concerned, the signal generation unit 15 changes the light adjustment signal and adjusts the high frequency output of the inverter circuit 2. In such a way, the light adjustment control circuit 4 can allow the light quantity of the discharge lamp La to coincide with the light quantity of the target value, which is stored in the setting unit 2. However, also in the discharge lamp lighting device according to the second embodiment, the light adjustment signal outputted from the signal generation unit 15 is limited by the electric power suppression unit 16 so that the electric power supplied to the discharge lamp La cannot exceeds the upper limit value (for example, 55 W) thereof.

As described above, also in the discharge lamp lighting device according to the second embodiment, the light quantity outputted from the discharge lamp La, that is, the illuminance can be maintained to be substantially constant during the period of the operation regardless of a light quantity deterioration of the discharge lamp La. Moreover, the electric power supplied to the discharge lamp La is controlled so as to be increased following the light quantity deterioration of the discharge lamp La. Accordingly, in accordance with the discharge lamp lighting device according to the second embodiment, equivalent effects to those of the discharge lamp lighting device according to the first embodiment can be exerted.

Figure 5:
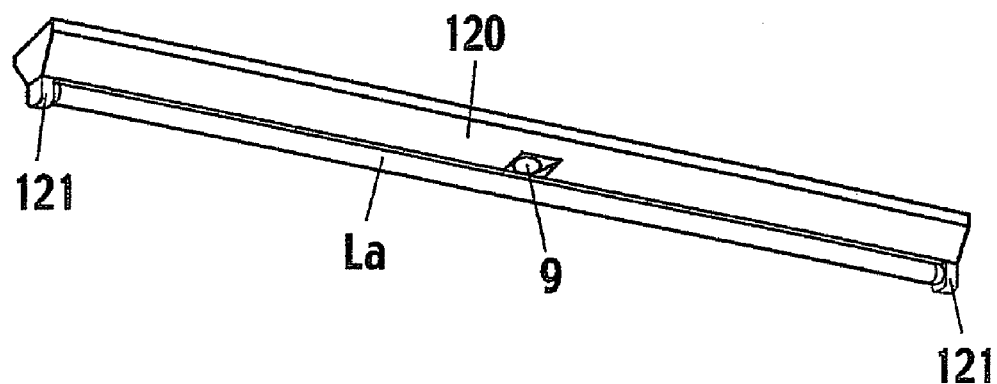
FIG. 5 is a perspective view showing a light fixture in the second embodiment to which the present invention is applied.

In FIG. 5, a light fixture including the discharge lamp lighting device according to the second embodiment is shown. This light fixture is of a direct ceiling-mounted type, including: a fixture body 120 formed into a triangular shape; and a pair of lamp sockets 121 and 121 provided on lower surfaces of both ends in a longitudinal direction of the fixture body 120. This light fixture houses the discharge lamp lighting device (not shown) in the fixture body 120. Note that the light quantity sensor 9 is disposed on a center in a longitudinal direction of a lower surface of the fixture body 120.

Third Embodiment

Figure 6:
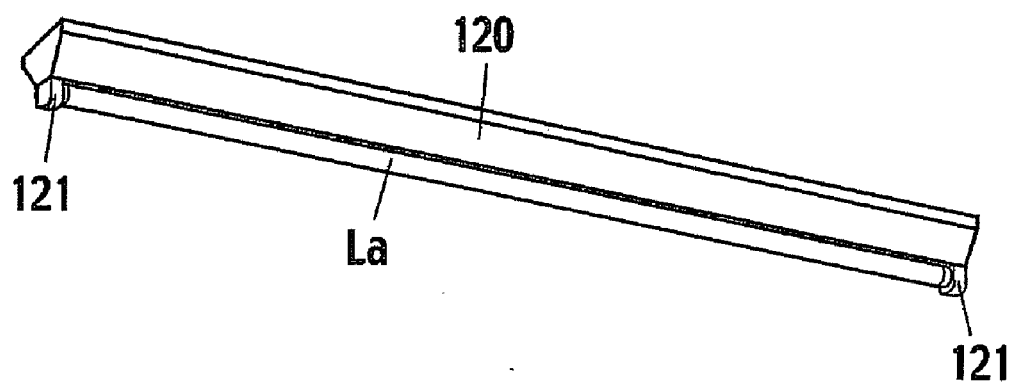
FIG. 6 is a perspective view showing a light fixture in a third embodiment to which the present invention is applied.

In FIG. 6, a light fixture according to a third embodiment is shown. In a similar way to the light fixture including the discharge lamp lighting device according to the second embodiment, this light fixture is of the direct ceiling-mounted type, including: the fixture body 120 formed into the triangular shape; and the pair of lamp sockets 121 and 121 provided on the lower surfaces of both ends in the longitudinal direction of the fixture body 120. In this light fixture, a discharge lamp lighting device (not shown) having a common configuration to that in the light fixture including the discharge lamp lighting device according to the first embodiment is housed in the fixture body 120.

As described in the first embodiment, in the fluorescent lamp FHF 32, the light emission efficiency is not decreased even if the electric power of approximately 55 W is supplied thereto, and further, the decrease of the light emission efficiency is suppressed to approximately −2% even if the electric power of approximately 60 W to 65 W is supplied to the fluorescent lamp concerned.

In this connection, in the light fixture according to the third embodiment, in the case of using the fluorescent lamp FHF 32 as the discharge lamp La, the lamp supply power, of which value is higher than 45 W as the rated electric power, is started to be supplied to the fluorescent lamp concerned at the initial period of the operation. Then, the lamp supply power is adjusted so as to become 60 W to 65 W on and after the rated lifetime of the discharge lamp La. This adjustment of the lamp supply power is realized by changing the light adjustment signal in response to the accumulated lighting time.

Figure 7:
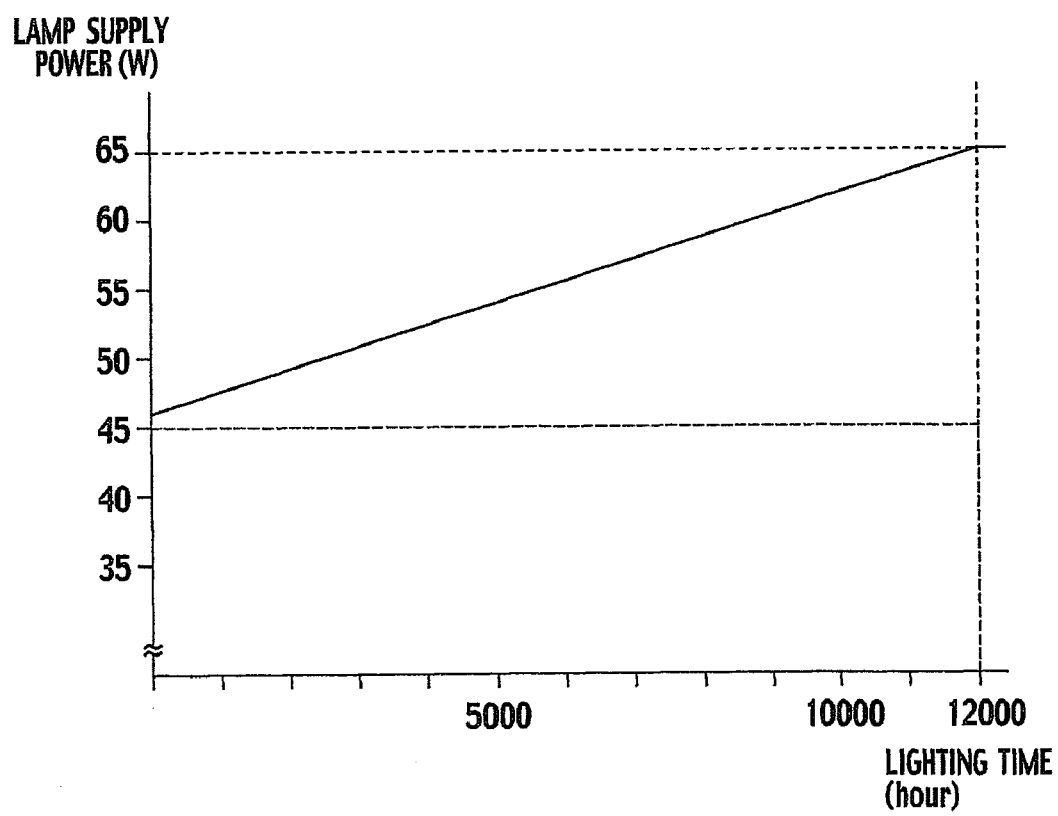
FIG. 7 is an operation explanatory diagram of a discharge lamp lighting device in the third embodiment to which the present invention is applied, showing a relationship between the lighting time and the lamp supply power.

Specifically, as shown in FIG. 7, the discharge lamp lighting device built in the light fixture according to the third embodiment sets the relationship between the accumulated lighting time and the light adjustment signal so as to allow the following. First, the lamp supply power at the point of time when the lighting is started (when the accumulated lighting time is 0) is allowed to be set at 46 W. Then, the lamp supply power is allowed to be linearly increased during the period from 0 to 12000 hours as the rated lifetime of the FHF 32 in the accumulated lighting time so that the lamp supply power can be 65 W at the point of time when 12000 hours elapse. Moreover, constant electric power (=65 W) is allowed to be supplied after the lamp supply power reaches 65 W. Thereafter, the discharge lamp lighting device stores the set relationship in the correction table. Here, the lamp supply power (=65 W) at the point of time when the rated lifetime elapses becomes a value approximately 1.33 times the rated electric power (=45 W).

As described above, the light fixture according to the third embodiment changes the lamp supply power from 46 W to 65 W. As obvious from FIG. 2(*a*), in the fluorescent lamp FHF 32, the light/electric power ratio becomes substantially constant when the lamp supply power is 46 W to 65 W, and accordingly, the light quantity can be increased without impairing the light emission efficiency of the discharge lamp La.

Incidentally, in the case of using the fluorescent lamp FHF 32 under the rated lamp electric power of 32 W, in the conventional light fixture for two lamps, the number of installed units is decided by taking the following luminous flux as a reference:

32 W×2 lamps×110 lm/W×0.7=4928 lm

As opposed to this, by considering that the light/electric power ratio is decreased to 0.98 when the lamp supply power is 65 W, the light fixture according to the third embodiment can realize the following luminous flux:

65 W×1 lamp×110 lm/W×0.98×0.7=4905 lm

In such a way, in accordance with the light fixture according to the third embodiment, by using only one lamp, such a luminous flux substantially equivalent to that of the conventional example of using two lamps can be obtained. Specifically, if only one lamp according to the third embodiment is installed in a place where the conventional light fixture using two fluorescent lamps with the rated electric power of 32 W is installed, then an illuminance equivalent to that of such a conventional example will be obtained. Naturally, by the fact that the number of discharge lamps is reduced from two to one, the materials of the fixture body are also saved to approximately a half, and the materials of the discharge lamps are also saved to a half. Accordingly, cost per unit of the light fixture can be reduced to a large extent.

Note that, in the case of making a setting so that the supply power to the discharge lamp La can be 60 W at the point of time when 12000 hours as the rated lifetime of the discharge lamp La elapse, by considering that the light/electric power ratio is decreased to 0.90 when 60 W is supplied, the following luminous flux can be obtained:

60 W×1 lamp×110 lm/W×0.90×0.7=4158 lm

The discharge lamp lighting device is set so that the electric power supplied to the discharge lamp La can be suppressed constantly to 60 W after the electric power supplied to the discharge lamp La reaches 60 W. Accordingly, the electric power supplied to the discharge lamp La (fluorescent lamp of FHF 32) becomes 1.33 times the rated electric power of 45 W, and a luminous flux of approximately 93% of that of the conventional fixture can be obtained.

Fourth Embodiment

Figure 8:
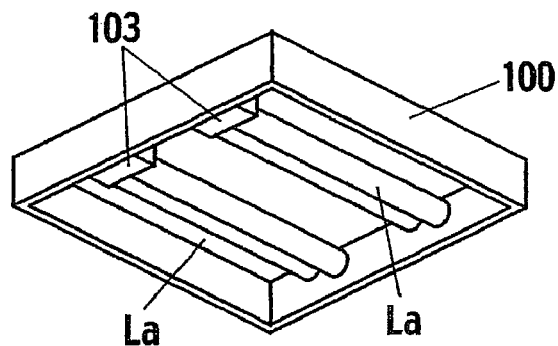
FIG. 8 is a perspective view showing a light fixture according to a fourth embodiment to which the present invention is applied.

In FIG. 8, a light fixture according to a fourth embodiment is shown. This light fixture includes: a fixture body 100 with a shape of a rectangular box in which a lower surface is open in a similar way to the light fixture described in the first embodiment; and a pair of lamp sockets 103 which are provided on one side surface of the fixture body 100 and allow discharge lamps La composed of compact fluorescent lamps FHF 32 to be mounted thereon. In this light fixture, a discharge lamp lighting device (not shown) having a common configuration to that of the first embodiment or the second embodiment is attached to the fixture body 100.

Figure 9:
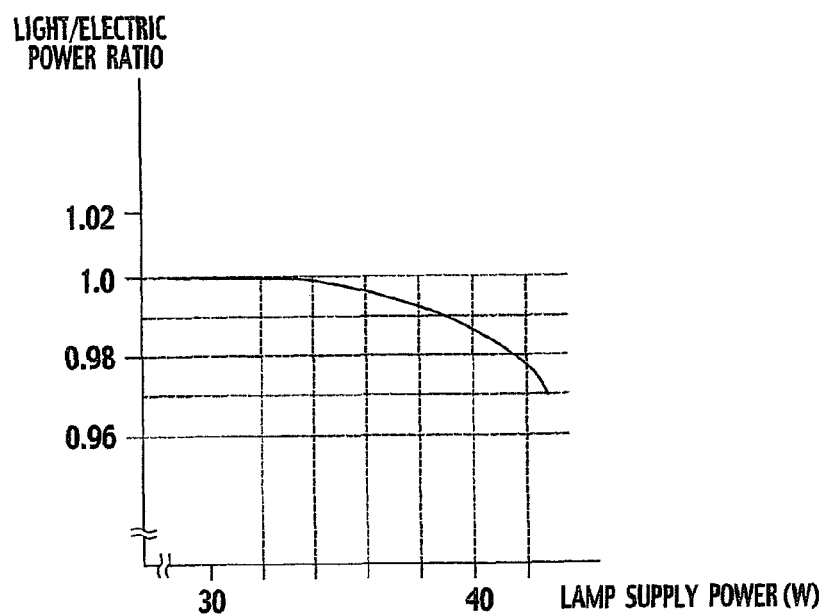
FIGS. 9(a) and 9(b) are operation explanatory diagrams of the light fixture according to the fourth embodiment to which the present invention is applied.
Figure 9:
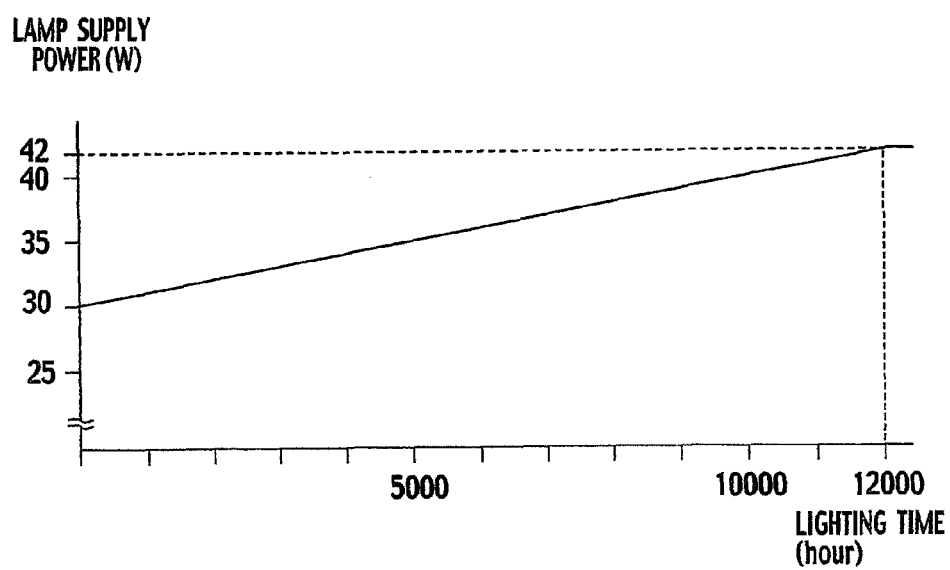

Here, the inventors of the present invention investigated a relationship between the lamp electric power and the light quantity for the compact fluorescent lamp FHF 32, and then result shown in FIG. 9(a) were obtained. Note that the FHF 32 is a high frequency fluorescent lamp with a tube length of approximately 410 mm and a tube diameter of 17.5 mm, in which the rated lamp electric power is 32 W. As obvious from FIG. 9(a), in the compact fluorescent lamp FHF 32, results were obtained, that the light/electric power ratio became substantially 1.0 in the case where the lamp supply power was 34 W or less, and that the light/electric power ratio became approximately 0.98 when the lamp supply power was 42 W.

Accordingly, in the case of using the compact fluorescent lamp FHF 32 as the discharge lamp La, the light fixture according to the fourth embodiment starts to supply the lamp supply power from a value lower than 32 W as the rated electric power at the initial period of the operation, changes the light adjustment signal in response to the accumulated lighting time so that the lamp supply power can be a value higher than 32 W as the rated electric power on and after a rated lifetime of the discharge lamp La, and thereby adjusts the lamp supply power (output of the inverter circuit 2).

Specifically, as shown in FIG. 9(b), the light fixture sets the relationship between the accumulated lighting time and the light adjustment signal so as to allow the following. First, the lamp supply power at the point of time when the lighting is started (when the accumulated lighting time is 0 is allowed to be set at 30 W. Then, the lamp supply power is allowed to be linearly increased during the period from 0 to 12000 hours as the rated lifetime of the FHF 32 in the accumulated lighting time so that the lamp supply power can be 42 W at the point of time when 12000 hours elapse. Moreover, constant electric power (=42 W) is allowed to be supplied after the lamp supply power reaches 42 W. Thereafter, the light fixture stores the set relationship in the correction table. Here, the lamp supply power (=42 W) at the point of time when the rated lifetime elapses becomes a value approximately 1.3 times the rated electric power (=32 W).

Fifth Embodiment

Figure 10:
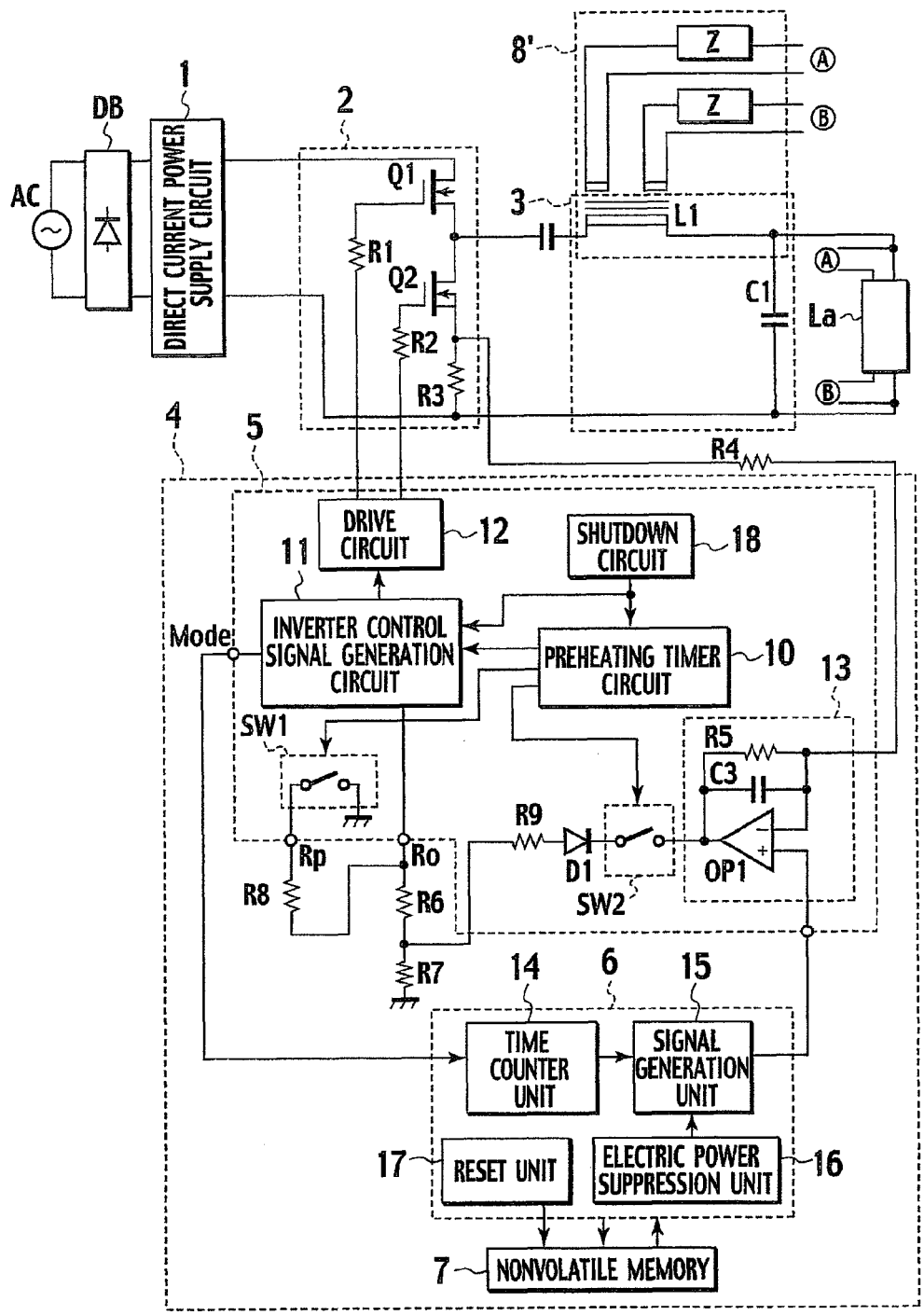
FIG. 10 is a circuit configuration diagram of a discharge lamp lighting device according to a fifth embodiment to which the present invention is applied.

In FIG. 10, a circuit configuration diagram of a discharge lamp lighting device according to a fifth embodiment of the present invention is shown. The fifth embodiment has a feature in a configuration of a preheating circuit 8', and configurations other than that of the preheating circuit 8' are common to those of the first embodiment. Hence, the same reference numerals are assigned to constituents common to those of the first embodiment, and a description thereof will be omitted.

The preheating circuit 8' composing the discharge lamp lighting device according to the fifth embodiment is composed of: a resonating inductor L1 (primary winding) composing the resonant circuit 3; a pair of secondary windings L2 and L2 magnetically coupled to the resonating inductor L1 and connected to the respective filaments (not shown) of the discharge lamps La; and impedance circuits Z and Z individually inserted between the secondary windings L2 and L2 and the filaments.

FIG. 10 shows connection relationships between the impedance circuits Z and Z and the filaments by reference symbols A and B. Each of these impedance circuits Z and Z is composed of, for example, an LC series resonant circuit having a resonant frequency substantially equal to the preheating frequency. In the advanced preheating mode, the impedance circuit Z supplies a current (preheating current) enough to allow the impedance to become substantially zero to the filament. In the lighting mode, the impedance circuit Z increases the impedance and suppresses the current supply to the filament.

Figure 11:
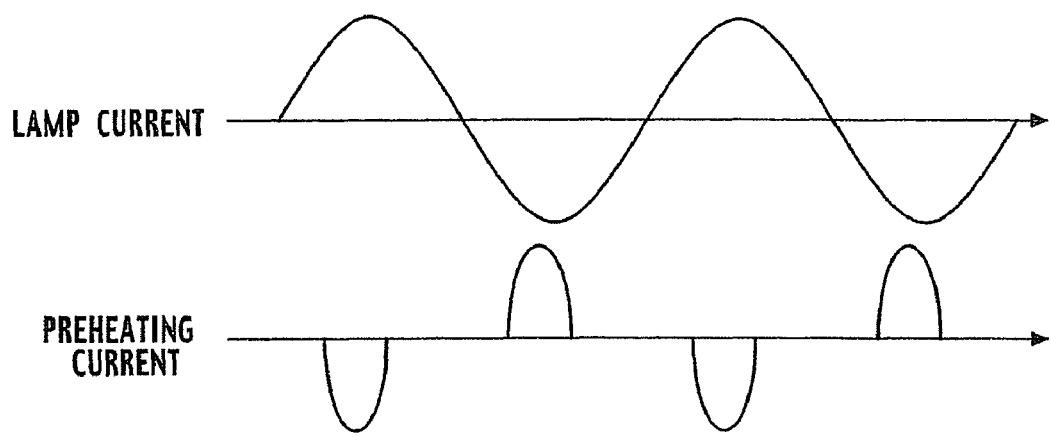
FIG. 11 is an operation explanatory view of a discharge lamp lighting device according to the fifth embodiment to which the present invention is applied.

Moreover, as shown in FIG. 11, each of the secondary windings L2 and L2 is composed so that a phase of the current supplied to the filament of the discharge lamp La from the preheating circuit 8' can be inverted within a range of 90 degrees to 180 degrees with respect to a phase of the lamp current supplied to the discharge lamp La through the resonant circuit 3. Accordingly, a magnitude of a synthesized current supplied to each discharge lamp La can be suppressed.

As described above, in the fifth embodiment, the value of the current supplied from the preheating circuit 8' to each filament of the discharge lamp La is suppressed at the time when the discharge lamp La is lighted, whereby the rise of the filament temperature can be suppressed. Note that it is obvious that a similar effect is exerted even in the case of allowing the preheating circuit 8' in the fifth embodiment to replace the preheating circuit 8 in the second embodiment.

Sixth Embodiment

Figure 12:
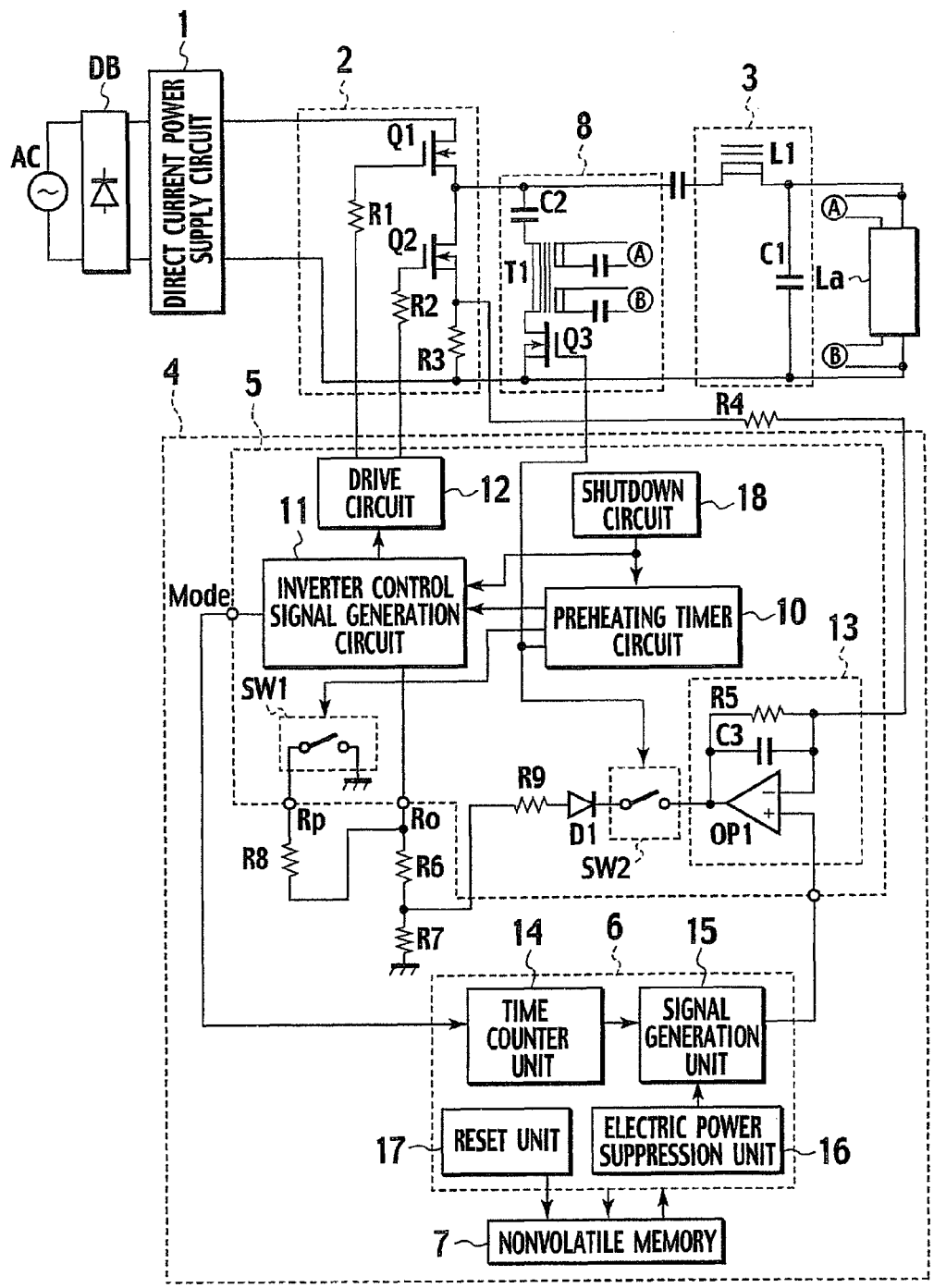
FIG. 12 is a circuit configuration diagram of a discharge lamp lighting device according to a sixth embodiment to which the present invention is applied.

In FIG. 12, a circuit configuration diagram of a discharge lamp lighting device according to a sixth embodiment of the present invention is shown. The sixth embodiment has a feature in the configuration of the preheating circuit 8, and configurations other than that of the preheating circuit 8 are common to those of the first embodiment. Hence, the same reference numerals are assigned to constituents common to those of the first embodiment, and a description thereof will be omitted.

The preheating circuit 8 composing the discharge lamp lighting device according to the sixth embodiment has a feature in that a switching element Q3 composed of a normally-off MOSFET is connected in series to the primary winding of the preheating transformer T1. This switching element Q3 is subjected to on/off control by the preheating timer circuit 10, is switched on during the advanced preheating period and the starting period, and is switched off after the discharge lamp La is lighted.

As described above, during the advanced preheating period and the starting period, the switching element Q3 is switched on by the preheating timer circuit 10, and the preheating current is supplied from the preheating circuit 8 to the filament of the discharge lamp La. Then, at the time when the discharge lamp La is lighted, the switching element Q3 is switched off by the preheating timer circuit 10, and shuts the supply of the current from the preheating circuit 8 to the filament of the discharge lamp La. As a result, the preheating circuit 8 sets, to zero, the current supplied from the preheating circuit 8 to the filament of the discharge lamp La at the time when the discharge lamp lighted, and thereby can suppress the rise of the filament temperature.

Figure 13:
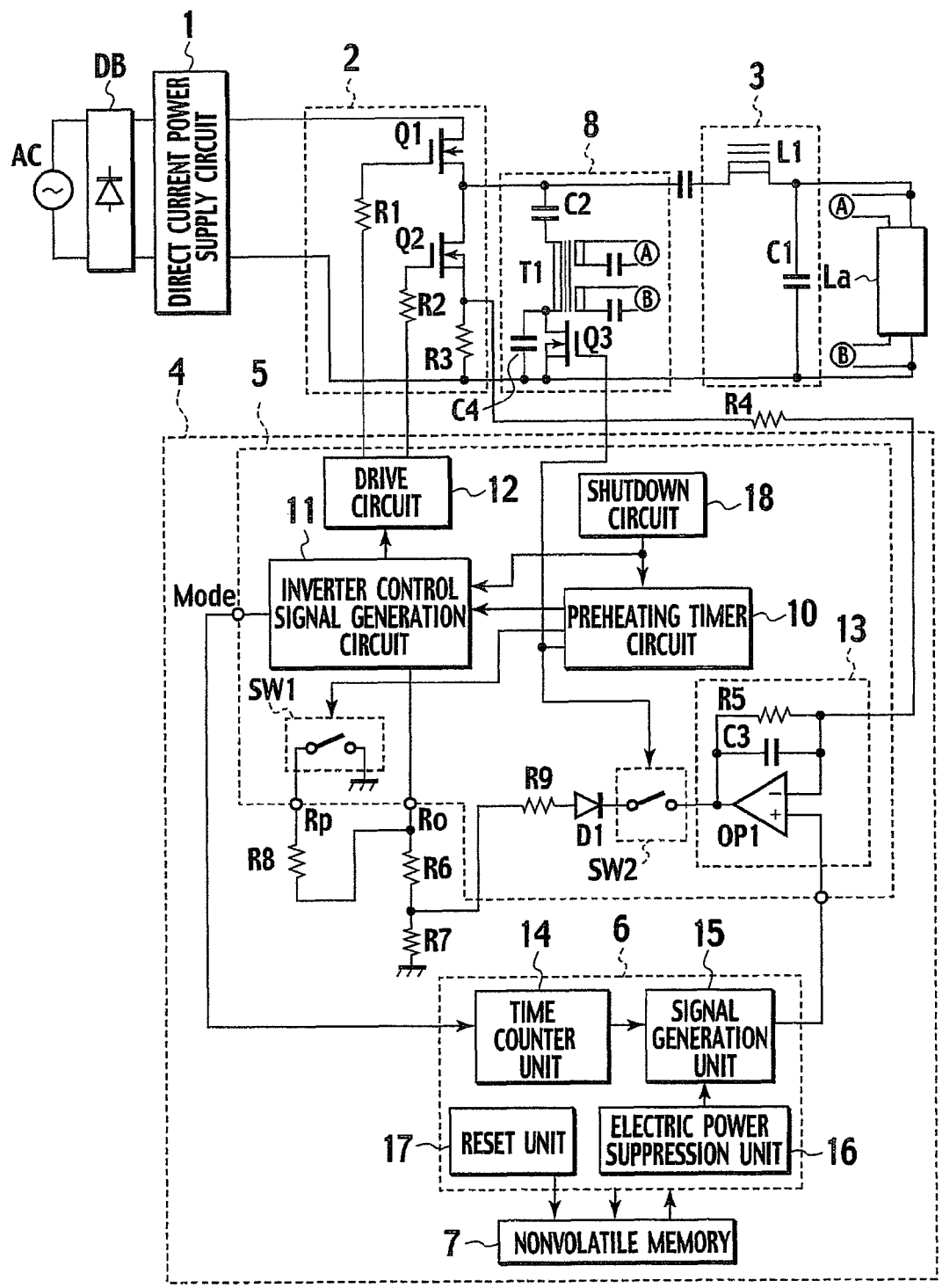
FIG. 13 is another circuit configuration diagram of the discharge lamp lighting device according to the sixth embodiment to which the present invention is applied.

Incidentally, as shown in FIG. 13, the preheating transformer T1 may be composed so that a capacitor C4 can be connected in parallel to the switching element Q3, and that the phase of the current supplied from the preheating circuit 8 to the filament can be inverted by approximately 180 degrees with respect to the phase of the lamp current at the time when the discharge lamp La is lighted. In the preheating circuit 8 as described above, also when the switching element Q3 is switched off (the time when the discharge lamp La is lighted), the current flows to the primary winding of the preheating transformer T1 through the capacitor C4, and the current is kept on being supplied to the filament of the discharge lamp La. However, the phase of current supplied from the preheating circuit 8 at the time when the discharge lamp La is lighted and the phase of the lamp current are inverted from each other by approximately 180 degrees, and accordingly, in comparison with the case of only the lamp current, the current (synthesized current of the supplied current from the preheating circuit 8 and the lamp current) flowing through the discharge lamp La is reduced. As a result, the temperature rise of the filament of the discharge lamp La can be suppressed.

For example, in the case of setting the value of the current supplied to the preheating circuit 8 at approximately 100 to 300 mA by appropriately setting a capacitance value of the capacitor C4, a filament temperature (electrode temperature of the discharge lamp La) when a phase difference between the supplied current from the preheating circuit 8 and the lamp current was set at approximately 0 degree, a filament temperature when the phase difference concerned was set at approximately 180 degrees, and a filament temperature when the supplied current from the preheating circuit 8 at the time when the discharge lamp La was lighted was set at approximately zero, were measured. Results of the measurements are shown in FIG. 14.

Figure 14:
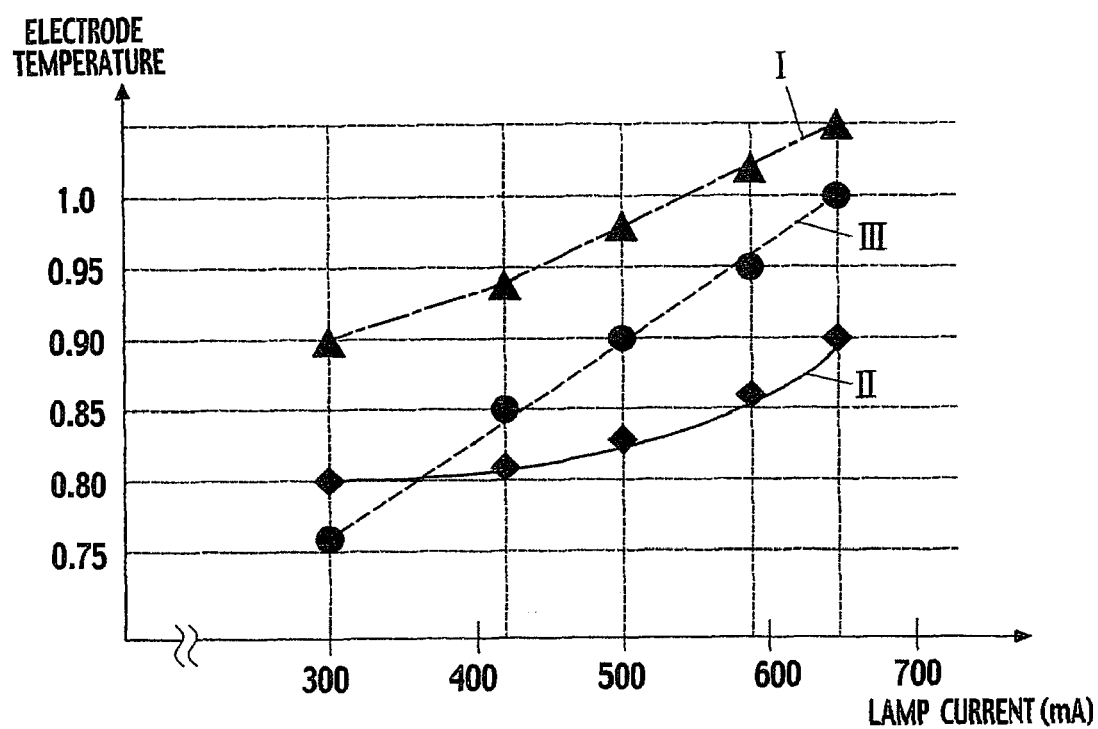
FIG. 14 is an explanatory diagram of experimental results obtained by investigating a relationship between a lamp current and an electrode temperature in the discharge lamp lighting device according to the sixth embodiment to which the present invention is applied.

In FIG. 14, the lamp currents are taken on an axis of abscissas, and electrode temperatures normalized by taking, as 1, an electrode temperature in the case where a current of approximately 650 mA is flown to the straight tube fluorescent lamp (for example, FHF 32) are taken on an axis of ordinates. Moreover, the electrode temperature when the phase difference was set at approximately 0 degree is shown by an alternate long and short dash line I, the electrode temperature when the phase difference was set at approximately 180 degrees is shown by a solid line II, and the electrode temperature when the supplied current was set at substantially zero is shown by a broken line III.

As obvious from experimental results shown in FIG. 14, in comparison with the case (alternate long and short dash line I) where the phase difference between the supplied current from the preheating circuit 8 and the lamp current at the time when the discharge lamp La is lighted is substantially 0 degree, the electrode temperature drops in the case (broken line III) where the supplied current from the preheating circuit 8 at the time when the discharge lamp La is lighted is set at substantially zero, and the electrode temperature further drops in the case (solid line II) where the phase difference between the supplied current from the preheating circuit 8 and the lamp current is approximately 180 degrees. Hence, even if a lamp current of approximately 500 to 650 mA is flown, the rise of the electrode temperature at the time when the discharge lamp La is lighted can be suppressed by composing the preheating circuit 8 so that the phase difference between the lamp current and the supplied current from the preheating circuit 8 can be approximately 180 degrees. Hence, an apprehension that the lifetime of the discharge lamp La may be impaired is eliminated. Note that it is obvious that a similar effect is exerted even in the case of applying the configuration of the preheating circuit 8 in the sixth embodiment to the second embodiment.

INDUSTRIAL APPLICABILITY

The present invention is applicable to a discharge lamp lighting device that lights the discharge lamp such as the fluorescent lamp, and to a light fixture that mounts the discharge lamp lighting device thereon.

The invention claimed is:

1. A discharge lamp lighting device including: an inverter circuit that includes one or a plurality of switching elements and converts a direct current input into a high frequency alternating current output by switching the switching elements at a high frequency; one or a plurality of resonating inductors and one or a plurality of resonating capacitors, which compose a resonant circuit together with a discharge lamp and are connected between output terminals of the inverter circuit; and a light adjustment control circuit that adjusts high frequency electric power supplied from the inverter circuit through the resonant circuit to the discharge lamp by controlling the switching of the switching elements,
   wherein the light adjustment control circuit includes: electric power correcting means for controlling the high frequency electric power of the inverter circuit to gradually increase following elapse of an operating time of the discharge lamp during a period from an operation start of the discharge lamp to a predetermined time after the discharge lamp reaches a rated lifetime thereof; and electric power suppressing means for controlling the high frequency electric power of the inverter circuit to become a predetermined value or less on and after the predetermined time, and
   the predetermined value is a value larger than 1.2 times electric power defined by a tube shape, tube length and tube diameter of the discharge lamp.

2. The discharge lamp lighting device according to claim 1, wherein the electric power correcting means includes time counting means for counting an accumulated lighting time of the discharge lamp, adjusts the high frequency electric power of the inverter circuit in response to the accumulated lighting time counted by the time counting means, and adjusts the high frequency electric power of the inverter circuit so that electric power equal to or more than the defined electric power can be supplied to the discharge lamp at a point of time of the operation start of the discharge lamp.

3. The discharge lamp lighting device according to claim 1, wherein the electric power correcting means includes light quantity detecting means for detecting a light quantity of the discharge lamp, adjusts the high frequency electric power of the inverter circuit in response to the light quantity detected by the light quantity detecting means, and adjusts the high frequency electric power of the inverter circuit so that electric power equal to or more than the defined electric power can be supplied to the discharge lamp at a point of time of the operation start of the discharge lamp.

4. The discharge lamp lighting device according to claim 1, wherein the predetermined value is a value equal to or more than 1.3 times the defined electric power.

5. The discharge lamp lighting device according to claim 1, wherein, in a case where the discharge lamp is a straight tube fluorescent lamp having a tube length of approximately 1200 mm and a tube diameter of approximately 25.5 mm, the predetermined value is set at 65 W or less.

6. The discharge lamp lighting device according to claim 1, wherein, in a case where the discharge lamp is a compact fluorescent lamp having a tube length of approximately 410 mm and a tube diameter of approximately 17.5 mm, the predetermined value is set at 42 W or less.

7. The discharge lamp lighting device according to claim 1, wherein preheating current supplying means for supplying a current to a filament of the discharge lamp is provided, and the preheating current supplying means reduces a value of the current supplied after the discharge lamp is started than a value of the current at an advanced preheating time when the current is supplied to the discharge lamp before the discharge lamp is started.

8. The discharge lamp lighting device according to claim 7, wherein the preheating current supplying means includes: a primary winding through which a high frequency current is flown by the inverter circuit; a secondary winding connected to the filament of the discharge lamp and magnetically coupled to the primary winding to flow, to the filament, a current in which a phase is inverted with respect to a phase of a lamp current of a time when the discharge lamp is lighted; and a switching element inserted into a power feed line from the inverter circuit to the primary winding.

9. A light fixture, comprising:

the discharge lamp lighting device according to claim 1;

a fixture body to which the discharge lamp lighting device is attached: and sockets which are provided on the fixture body, allow a discharge lamp to be mounted thereon freely detachably, and electrically connect the discharge lamp lighting device and the discharge lamp to each other.

* * * * *

UNITED STATES PATENT AND TRADEMARK OFFICE
CERTIFICATE OF CORRECTION

| | | |
|---|---|---|
| PATENT NO. | : 7,898,191 B2 | Page 1 of 1 |
| APPLICATION NO. | : 12/160677 | |
| DATED | : March 1, 2011 | |
| INVENTOR(S) | : Katunobu Hamamoto et al. | |

It is certified that error appears in the above-identified patent and that said Letters Patent is hereby corrected as shown below:

At column 18, line 20 of the printed patent, please change "attached: and" to --attached; and--.

Signed and Sealed this
Fourth Day of October, 2011

David J. Kappos
*Director of the United States Patent and Trademark Office*